March 9, 1954 C. P. POHLAND Re. 23,798

DENTAL MOISTURE SHIELD

Original Filed June 12, 1950

Carl P. Pohland

INVENTOR.

BY Clarence A. O'Brien and Harvey B. Jacobson

Attorneys

Reissued Mar. 9, 1954

Re. 23,798

UNITED STATES PATENT OFFICE 23,798

DENTAL MOISTURE SHIELD

Carl P. Pohland, Sheboygan, Wis., assignor to Escapo, Inc., Sheboygan, Wis., a corporation of Wisconsin Original No. 2,563,361, dated August 7, 1951, Serial No. 167,600, June 12, 1950. Application for reissue July 29, 1953, Serial No. 371,195

7 Claims. (Cl. 32—36)

Matter enclosed in heavy brackets [ ] appears in the original patent but forms no part of this reissue specification; matter printed in italics indicates the additions made by reissue.

This invention relates to new and useful improvements and structural refinements in dental moisture shields, and the principal object of the invention is to provide a simple and highly efficient device of this nature, which may be conveniently employed for shielding a tooth or teeth against moisture while dental repairs are in progress.

The above object is achieved by the provision of a device which is adapted for attachment to two suitably spaced teeth, preferably the first bicuspids, an important feature of the invention residing in means for adjusting the device so as to accommodate different sizes and spacing of teeth.

Another feature of the invention resides in the provision of means on the device for sustaining absorbent elements or pads thereon.

Some of the advantages of the invention lie in its simplicity of construction, as aforesaid, in its efficient operation, and in its adaptability to economical manufacture.

With the above more important objects and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
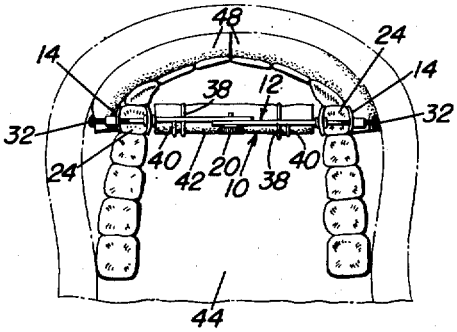
Figure 1 is an underside plan view of the invention in situ in a patient's mouth.

Referring now to the accompanying drawings in detail, the invention consists of a dental moisture shield which is designated generally by the reference character 10 and embodies in its construction an elongated support member 12 provided at the opposite ends thereof with a pair of tooth receiving sockets 14.

Figure 2:
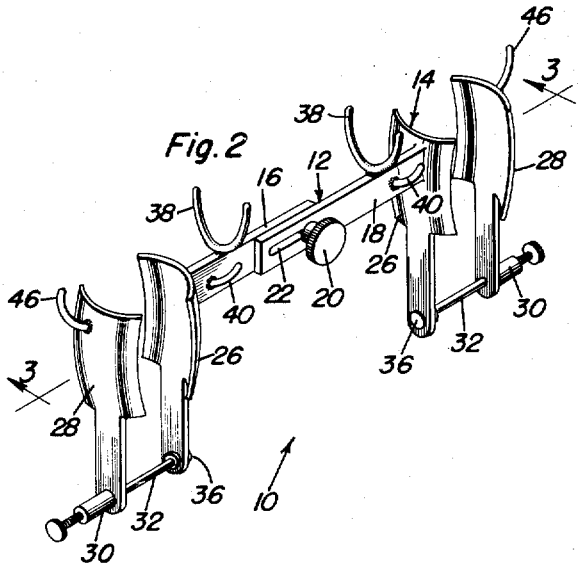
Figure 2 is a perspective view of the invention per se.
Figure 3:
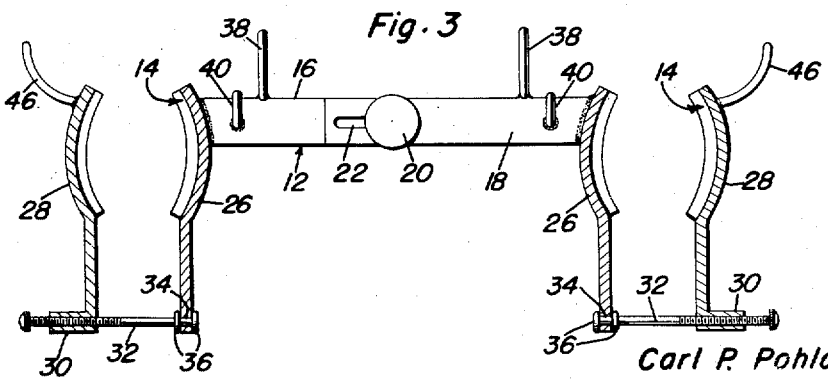
Figure 3 is a sectional view, taken substantially in the plane of the line 3—3 in Figure 2.

The member 12 simply consists of a pair of complemental straps 16, 18 which have overlapped inner end portions as is best shown in Figure 2, the strap 16 being provided with a clamping screw 20 which extends through a slot 22 in the strap 18, so that by simply loosening this screw, the length of the support member 12 may be increased or decreased and the distance between the two sockets 14 may be correspondingly varied to conform to the transverse spacing of two teeth (preferably bicuspids) 24 to which the application is applied as shown in Figure 1.

Each of the aforementioned sockets 14 consists of an inner jaw 26 which is secured to the support member 12 and an outer jaw 28 equipped with an internally screw threaded boss 30 to receive a clamping screw 32 which is freely rotatable in an aperture 34 in the inner jaw 26 but is provided with a pair of spaced shoulders 36 at the opposite sides of the inner jaw 26, so that axial sliding or shifting of the screw 32 in the aperture 34 is not possible.

By virtue of the screw 32, the outer jaws 28 are not only connected to the inner jaws 26, but also, the distance of the outer jaws from the inner jaws may be varied so as to accommodate therebetween teeth of different sizes. It is to be noted that the jaws 26, 28 preferably have concave opposing surfaces which are frictionally engageable with opposite sides of a tooth so as to sustain the entire device in position in the patient's mouth.

Substantially semi-circular keeper prongs 38 and further, arcuate keeper prongs 40 are provided on the straps 16, 18 of the support member 12 to accommodate a roll or pad of absorbent material 42 and to sustain the same in position against the palate 44, while additional keeper prongs 46 are provided on the outer jaws 28 to accommodate an absorbent element or roll 48 placed between the patient's lip and front teeth, as shown in Figure 1.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a dental moisture shield, the combination of an elongated support member, means for lengthening and shortening the same, a pair of expansible and contractible tooth receiving sockets provided at the respective opposite ends of said member, means for expanding and contracting said sockets, and means on said member and on said sockets for attaching absorbent elements thereto.

2. The device as defined in claim 1 wherein each of said sockets comprises a pair of spaced jaws movable toward and away from each other and adapted to frictionally engage opposite sides of a tooth.

3. In a dental moisture shield, the combination of an elongated support member, means for lengthening and shortening the same, a pair of expansible and contractible tooth receiving sockets provided at the respective opposite ends of said member, each socket including an inner jaw secured to the member, an outer jaw spaced from said inner jaw, and a clamping screw adjustably connecting the outer jaw to the inner jaw whereby the jaws may be frictionally engaged with opposite sides of a tooth, and sets of keeper prongs provided on said support member and on the outer jaws of the respective sockets for attaching absorbent elements thereto.

4. The device as defined in claim 3 wherein said support member comprises a pair of complemental straps having overlapped inner end portions one of which is provided with a longitudinally extending slot, said means including a screw provided in the overlapped portion of the second strap and extending through said slot.

5. *A dental moisture shield device for use in the mouth of a dental patient, comprising, an ex-*

*tensible elongated support member having means for co-operation with a tooth to maintain said member in position in the mouth of the patient, and means on said support member to retain an absorbent element in a given position in the mouth of the patient.*

*6. In a dental moisture shield, the combination of an extensible elongated support member, a pair of tooth receiving sockets at the respective ends of said member, and means on said member for accommodating an absorbent element thereon.*

*7. In a dental moisture shield, the combination of an elongated support member, means for lengthening and shortening the same, a pair of expansible and contractible tooth receiving sockets, and means on said member for attaching an absorbent element thereto.*

CARL P. POHLAND.

References Cited in the file of this patent or the original patent

UNITED STATES PATENTS

| Number | Name | Date |
|---|---|---|
| 335,747 | Elliott | Feb. 9, 1886 |
| 1,520,753 | Ivory | Dec. 30, 1924 |
| 2,568,317 | Bump | Sept. 18, 1951 |